US006803002B2

(12) United States Patent
Suto et al.

(10) Patent No.: US 6,803,002 B2
(45) Date of Patent: Oct. 12, 2004

(54) METHOD FOR MAKING AND TREATING WALL BLOCKS

(75) Inventors: Antal Z. Suto, Elburn, IL (US); John A. Campau, Zeeland, MI (US); John Daniel Campau, Holland, MI (US); Donald L. Reuschel, Holland, MI (US); Robert A. MacDonald, Plymouth, MN (US)

(73) Assignee: Keystone Retaining Wall Systems, Inc., Bloomington, MN (US)

( * ) Notice: Subject to any disclaimer, the term of this patent is extended or adjusted under 35 U.S.C. 154(b) by 148 days.

(21) Appl. No.: 10/150,484

(22) Filed: May 17, 2002

(65) Prior Publication Data

US 2003/0214069 A1 Nov. 20, 2003

(51) Int. Cl.[7] .......................... B28B 11/08; B29C 59/02

(52) U.S. Cl. ....................... 264/162; 264/157; 264/293; 264/333; 425/343; 425/385; 425/403.1; 249/119; 249/130; 52/741.1

(58) Field of Search ................................ 264/162, 293, 264/333, 157; 425/343, 385, 403.1; 249/119, 130; 52/741.1

(56) References Cited

U.S. PATENT DOCUMENTS

| | | | | |
|---|---|---|---|---|
| 2,146,957 A | * | 2/1939 | Jones | 425/385 |
| 2,867,204 A | * | 1/1959 | Arvay | 125/6 |
| 2,912,969 A | * | 11/1959 | Masson | 125/23.01 |
| 3,754,850 A | * | 8/1973 | Pate | 425/385 |
| 3,904,245 A | * | 9/1975 | Clarke | 299/37.4 |
| 4,147,491 A | * | 4/1979 | Postell, Jr. | 425/385 |
| 4,495,132 A | * | 1/1985 | Johnson | 264/293 |
| 4,568,260 A | * | 2/1986 | Paul et al. | 425/106 |
| 4,914,876 A | | 4/1990 | Forsberg | 405/286 |
| 5,078,940 A | | 1/1992 | Sayles | 264/154 |
| 5,217,630 A | | 6/1993 | Sayles | 249/52 |
| RE34,314 E | | 7/1993 | Forsberg | 52/562 |
| 6,109,906 A | | 8/2000 | Castonguay et al. | 425/353 |
| 6,138,983 A | | 10/2000 | Sievert | 249/114.1 |
| 6,149,352 A | | 11/2000 | MacDonald | 405/284 |
| 6,224,815 B1 | | 5/2001 | LaCroix et al. | 264/333 |
| 6,279,291 B1 | | 8/2001 | Geusens et al. | 52/741.1 |
| 6,540,501 B1 | * | 4/2003 | Bott | 425/385 |
| 6,561,786 B2 | * | 5/2003 | Ciccarello | 425/343 |
| 6,668,816 B1 | * | 12/2003 | Pedersen et al. | 125/23.01 |
| 6,685,459 B2 | * | 2/2004 | Hess et al. | 425/343 |

FOREIGN PATENT DOCUMENTS

| | | | | |
|---|---|---|---|---|
| CA | 2127191 A1 | * | 10/1994 | B44F/11/06 |
| EP | 0 339 308 A1 | | 2/1989 | |
| EP | 666372 A1 | * | 8/1995 | E01C/5/06 |

OTHER PUBLICATIONS

Derwent Abstract of EP 666372 A1, 2001, Derwent Information Limited, Derwent Week # 200175.*

Derwent Abstract of EP–339308–A, 1997, Derwent Information Limited, Derwen Week 199732.*

* cited by examiner

*Primary Examiner*—Michael P. Colaianni
*Assistant Examiner*—Michael I. Poe
(74) *Attorney, Agent, or Firm*—Popovich, Wiles & O'Connell, P.A.

(57) ABSTRACT

A method for treating the surfaces and edges of a block to mimic the appearance of natural stone. The apparatus and method can treat up to four sides of a block, can be adjusted to provide varying degrees of surface and edge treatment, and useful in high volume block production equipment. Blocks are produced having a natural, weathered appearance without the damage, breakage, dust, or expense associated with conventional splitting and tumbling methods.

55 Claims, 17 Drawing Sheets

Fig. 10A
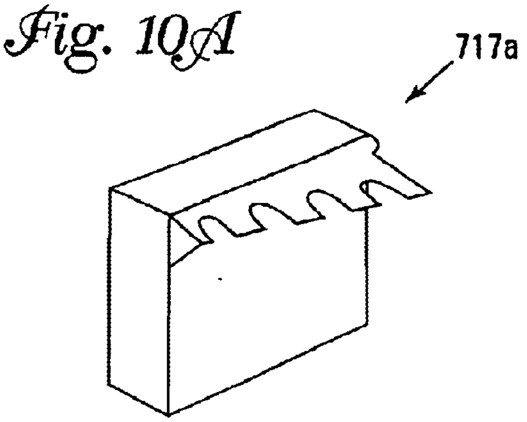
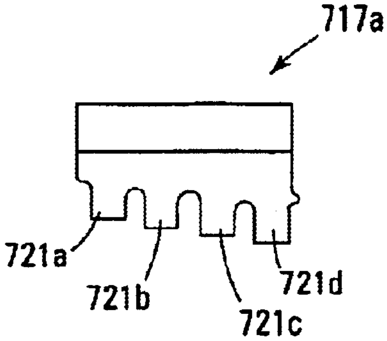
Fig. 10B
Fig. 10C
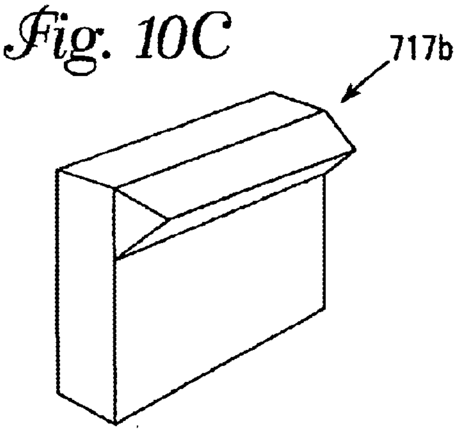
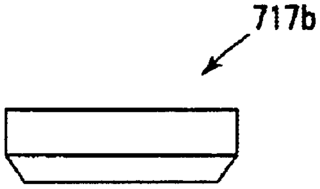
Fig. 10D
Fig. 10E
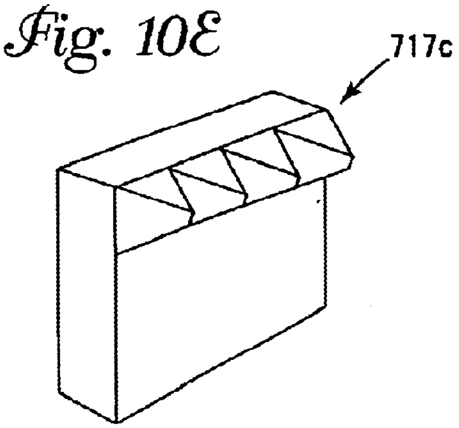
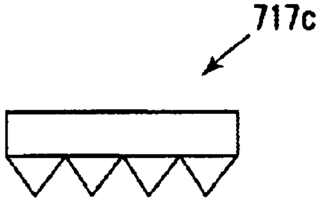
Fig. 10F

*Fig. 10G*
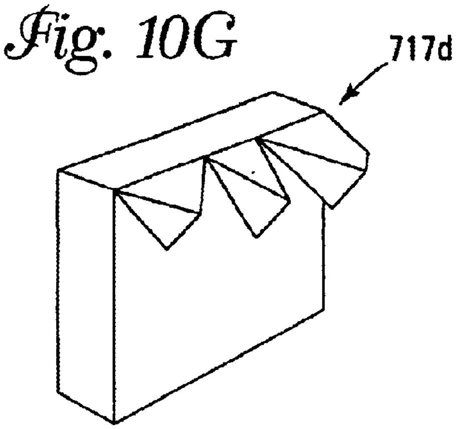
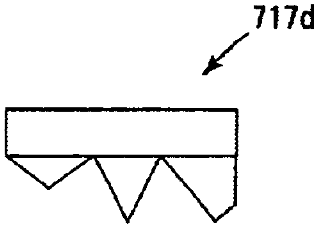
*Fig. 10H*
*Fig. 10I*
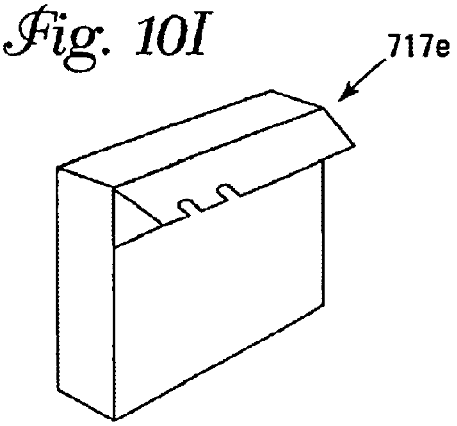
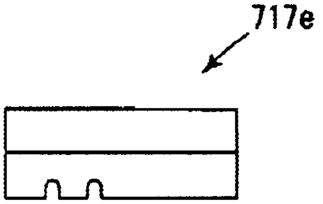
*Fig. 10J*

METHOD FOR MAKING AND TREATING WALL BLOCKS

FIELD OF THE INVENTION

This invention relates to blocks used for retaining walls, parapet walls, or for free-standing walls. In particular, this invention relates to an apparatus and method for creating a desired appearance and shape to a wall block.

BACKGROUND OF THE INVENTION

Retaining walls are used in various landscaping projects and are available in a wide variety of styles. Numerous methods and materials exist for the construction of retaining walls. Such methods include the use of natural stone, poured concrete, precast panels, masonry, and landscape timbers or railroad ties.

In recent years, segmental concrete retaining wall units, which are dry stacked (i.e., built without the use of mortar), have become widely accepted in the construction of retaining walls. One such unit is described in U.S. Pat. No. Re 34,314 (Forsberg) and another is described in U.S. Pat. No. 6,149,352 (MacDonald). Such retaining wall units have gained popularity because they are mass produced and, consequently, relatively inexpensive. They are structurally sound, easy and relatively inexpensive to install, and couple the durability of concrete with the attractiveness of various architectural finishes. Successful wall systems include, among other design elements, a pinning system that interlocks and aligns the retaining wall units, thereby providing structural strength and allowing efficient installation. Such systems are advantageous in the construction of larger walls, when combined with the use of geogrids hooked over the pins, as described in U.S. Pat. No. 4,914,876 (Forsberg).

Another important feature of retaining wall blocks is the appearance of the block. The look of weathered natural stone is very appealing for retaining walls. There are several methods in the art to produce concrete retaining wall blocks that mimic the look of natural stone. One well known method is to split the block during the manufacturing process so that the front face of the block has a fractured concrete surface that looks like a natural split rock. This method produces blocks with a vertical split face, but cannot produce a rounded or fractured top and bottom edge which may be a key feature of natural or quarried stone. Another method is to form blocks individually in a mold and texture the surfaces by removal of the mold. Additional machine texturing processes can then be applied.

Because of the natural variation in size of the stones used in stone retaining walls, the wall surface has variations in width from stone to stone. A wall block system capable of duplicating the appearance of natural stone walls is described in U.S. Pat. No. 6,149,352 (MacDonald), hereby incorporated herein by reference in its entirety. This system uses blocks of different widths and a connection system comprising a channel on each block and multiple pin receiving cavities to align the blocks. Thus this system can be used to produce a wall having random variations in face width and high structural integrity of the wall structure.

Another method to create a weathered stone appearance is to tumble the blocks together with other blocks in a large rotating canister. The collisions of the blocks in the tumbler chips off random pieces of the blocks, rounding the edges and creating a look that can be quite close to the appearance of a natural stone. This is a labor-intensive undertaking that also can result in undesirable damage to the blocks, blocks covered with dust, the environmental aspect of dealing with the dust by-product of tumbling and the high overall costs of production.

Another method to make naturally appearing blocks has been described in U.S. Pat. Nos. 5,078,940 and 5,217,630 (both to Sayles). These patents describe a method and an apparatus for manufacturing a concrete block having an irregular surface. The irregular surface can be made to look similar to split stone, and thus is very desirable. The process involves filling a mold cavity that has a plurality of projections with uncured block material (e.g., concrete) and causing a portion of the material, in the area designated to be the finished face(s), to be retained in place relative to the cavity walls when the block is removed from the cavity. This results in a split appearance for the surface, without having to perform the splitting operation. This is an advantage because the expense and time of conventional block splitting is avoided.

Other methods of molding to produce textured surfaces for a block include, for example, U.S. Pat. No. 6,224,815 (LaCroix et al.), in which a block mold is used to produce two blocks having a roughened or textured face. The mold has two cavities separated by a grate. The surfaces that face the grate have a roughened texture upon removal of material from the mold. The advantage to this arrangement is stated to be that the mold is self-cleaning. Another mold for producing a textured block surface is described in U.S. Pat. No. 6,138,983 (Sievert). This mold has upper and lower lips along at least one side wall. A lip or lips serve to strip material from the block as it is being removed from the mold, thus producing a roughened, or split, appearance to the block. Typically, retaining wall blocks are manufactured to have the desired appearance on the front face (i.e., the outer face of a wall) only. In the patents described above, the pattern or design is typically provided only to the front face because that is the only portion of the retaining wall block that is visible after the wall is constructed. Sometimes a portion of a side surface may be provided with a desired pattern or texture. In the Sayles' patents described above, a natural or split look is obtained for only the front face. Such blocks do not allow the user the option to use either the front, side, or back faces of the block interchangeability as the exposed "front face".

To create a wall block that has a roughened texture on the front, side and back surfaces poses certain problems. If a splitting method is used, multiple splits and two orientations for the splits are required to create a quadrilateral block with texture on three sides. In addition, when two opposing block units are split apart, there is typically little waste. However, when more than two sides are split, a waste slab is required. This adds to the expense and labor of processing the block.

Tumbling methods are also used to texture a block's surfaces. However, tumbling cannot be used when a block has a lip (often used for connecting and stabilizing blocks in a wall) or if the block has large voids (e.g., cores) or other elements that would be knocked off or destroyed by tumbling. In addition, if a tumbling method is used, substantial portions of the block faces will be ground smooth and not necessarily natural looking. Tumbling also is an expensive production method because blocks must be formed, cured sufficiently to withstand a tumbling process (e.g., typically for a minimum of 7 days and then transported to a tumbler for treatment. If the method combines both splitting and tumbling, the production costs, and thus the cost to the consumer, can be undesirably high.

It would be desirable to provide a way to produce a block with an overall weathered appearance as well as rounded edges which avoids the need for tumbling, and thus potentially damaging, a block. In addition, a method is needed to produce the desired appearance on at least three sides of a block that would avoid the need for tumbling the block.

SUMMARY OF THE INVENTION

This invention is an apparatus and a method for treating the surfaces and edges of a block to mimic the appearance of natural stone. This invention produces blocks having a natural, weathered appearance but avoids the damage, breakage, and expense associated with existing methods, such as splitting or tumbling. This invention also avoids producing heavily dust-coated blocks caused by the tumbling process. This is very desirable because the dust coating on the blocks is difficult to remove in a factory environment and can adhere to the blocks if they are exposed to water while stored in inventory. The present invention allows the treatment of up to four sides of a block, can be adjusted to provide varying degrees of surface and edge treatment, and is capable of keeping pace with high volume block production equipment with a negligible amount of dust.

The apparatus and method of this invention is useful for blocks used for purposes other than retaining walls, including any block in which a natural stone appearance is desirable. Though it is contemplated that the material comprising the blocks is concrete, it is further to be understood that the apparatus and method could be used with any suitable material, including slabs of natural stone.

The apparatus and method of this invention are desirable in a production environment due to rapid throughput and minimal product loss.

In one aspect, this invention is a method for treating the surface of a block, the block having an upper surface opposed to a lower surface, first and second opposed faces joining the upper and lower surfaces of the block to form upper and lower face edges, and first and second side surfaces joining the upper and lower surfaces of the block to form upper and lower surface edges, the method comprising positioning the block in a first treatment station including an edge rounding member; treating the block in the first treatment station to round the upper and lower face edges of at least one of the first and second opposed faces of the block; positioning the block in a second treatment station including a surface roughening member; and treating the block in the second treatment station to roughen a surface of at least one of the first and second opposed faces. The edge rounding member may comprise hammer elements. The surface roughening member may comprise flailing elements. The block may be immobilized in the first treatment station and the block may move through the second treatment station as the surface is roughened. The method may further comprise rotating the block within the first treatment station and treating the block to round the upper and lower surface edges of the at least one of the first and second side surfaces of the block and rotating the block within the second treatment station, and treating the block to roughen surface of the at least one of the first and second side surfaces. The block may move to a third treatment station including an edge rounding member, and be treated there to round the upper and lower surface edges of at least one of the first and second side surfaces of the block. The block may move to a fourth treatment station that includes a surface roughening member; and be treated to roughen the surface of at least one of the first and second side surfaces.

The hammer elements may comprise a segment having a plurality of teeth and the flailing elements may comprise hardened steel elements.

In another aspect, this invention is a method for treating the surface of a block by positioning the block in a first hammer station; treating the block in the first hammer station to round at least one of the upper and lower face edges of at least one of the first and second opposed faces the block; positioning the block in a first flail station; and treating the block in the first flail station to roughen a surface of at least one of the first and second opposed faces. The block may be immobilized in the first hammer station and it may move through the second treatment station as the surface is roughened. This method may further comprise rotating the block within the first hammer station and treating the block to round the upper and lower surface edges of the at least one of the first and second side surfaces of the block; as well as rotating the block within the first flail station and treating the block to roughen the surface of the at least one of the first and second side surfaces. The block may be moved to a second hammer station and treated to round the upper and lower surface edges. The block may move to a second flail station including a surface roughening member; and be treated in the second flail station to roughen one of the first and second side surfaces.

In a further aspect, this invention is an apparatus for treating the surface of a block, comprising a first treatment station having an edge rounding member configured to round the upper and lower face edges of at least one of the first and second opposed faces of the block; a second treatment station having a surface roughening member configured to roughen a surface of the at least one of the first and second opposed faces; and a first conveying member for moving the block from the first treatment station to the second treatment station. The apparatus may include a rotating member configured to rotate the block and a clamp to hold the block in the first treatment station. It may include a conveying means to move the block through the second treatment station while the surface is being roughened. The apparatus may further comprise a third treatment station having an edge rounding member configured to round of the upper and lower surface edge, and a fourth treatment station having a surface roughening member configured to roughen the surface of at least one of the first and second side surfaces. It may include a second conveying member for moving the block from the second treatment station to the third treatment station and a third conveying member for moving the block from the third treatment station to the fourth treatment station. The hammer elements may comprise a segment having a plurality of teeth and the segment may be linear or arcuate.

In another aspect, this invention is an apparatus for shaping the surface of a block comprising means for rounding the upper and lower face edges of at least one of the first and second opposed faces of the block; means for roughening a surface of at least one of the first and second opposed faces of the block; and means for moving the block between the rounding means and the roughening means. There may be means for rounding the upper and lower surface edges of the side surfaces, and means for roughening the side surfaces. The apparatus may include means for immobilizing the block and means for conveying the block.

In a further aspect, this invention is an apparatus for treating the surface of a block, comprising a first treatment station having a hammer element configured to round the upper and lower face edges of at least one of the first and second opposed faces of the block; a second treatment station having a flailing element configured to roughen a surface of at least one of the first and second opposed faces; and a pusher for moving the block from the first treatment station to the second treatment station. The apparatus may include a turntable, a clamp to hold the block, and means to convey the block from one station to another.

In a further aspect, this invention is a method of making wall blocks comprising forming the blocks in a mold which imparts a roughened surface texture to at least one of the faces of the blocks; removing the blocks from the mold; positioning at least one of the blocks in a first treatment station; and rounding the upper and lower face edges of the at least one face of the at least one block having a roughened surface texture in the first treatment station without tumbling the at least one block together with other blocks in a block tumbler. The method may include curing the blocks, and may further include positioning the at least one block in a second treatment station; and treating the at least one block to further roughen at least one face having a roughened surface texture.

In another aspect, this invention is a method of making wall blocks comprising forming the blocks in a mold which imparts a roughened surface texture to at least one of the faces of the blocks; removing the blocks from the mold; positioning at least one of the blocks in a first treatment station including an edge rounding member; rounding the upper and lower face edges of the at least one face of the at least one block having a roughened surface texture in the first treatment station without tumbling the at least one block together with other blocks in a block tumbler; positioning the at least one block in a second treatment station including a surface roughening member; and further roughening the surface of the at least one face having a roughened surface texture in the second treatment station.

In a further aspect, this invention is a method of making wall blocks comprising forming the blocks in a mold; removing the blocks from the mold; positioning at least one of the blocks in a first treatment station; and rounding the upper and lower face edges of at least one of the first and second opposed faces of the at least one block in the first treatment station without tumbling the at least one block together with other blocks in a block tumbler. This method may include curing the blocks and positioning a block in a second treatment station and treating it to roughen a surface of a block face. Hammer elements may round the upper and lower face edges and flailing elements may roughen the surface.

In another aspect, this invention is a method of making wall blocks comprising forming the blocks in a mold; removing the blocks from the mold; positioning the blocks in a first treatment station including an edge rounding member; rounding the upper and lower face edges of at least one of the first and second opposed faces of the blocks in the first treatment station; positioning the blocks in a second treatment station including a surface roughening member; and roughening at least one of the first and second opposed faces in the second treatment station.

In a further aspect, this invention is a method for treating the surface of a block comprising positioning the block in a first treatment station including an edge rounding member; treating the block in the first treatment station to round at least one of the upper and lower face edges of at least one of the first and second opposed faces of the block; positioning the block in a second treatment station including a surface roughening member; and treating the block in the second treatment station to roughen a surface of at least one of the first and second opposed faces.

In another aspect, this invention is a method of making wall blocks comprising forming the blocks in a mold which imparts a roughened surface texture to at least one of the faces of the blocks; removing the blocks from the mold; positioning at least one of the blocks in a first treatment station; and rounding at least one of the upper and lower face edges of the at least one face of the at least one block having a roughened surface texture in the first treatment station without tumbling the at least one block together with other blocks in a block tumbler.

BRIEF DESCRIPTION OF THE DRAWINGS

FIGS. 10A to 10J are views of alternate embodiments of the hammer element.

DESCRIPTION OF THE PREFERRED EMBODIMENTS

Figure 1:
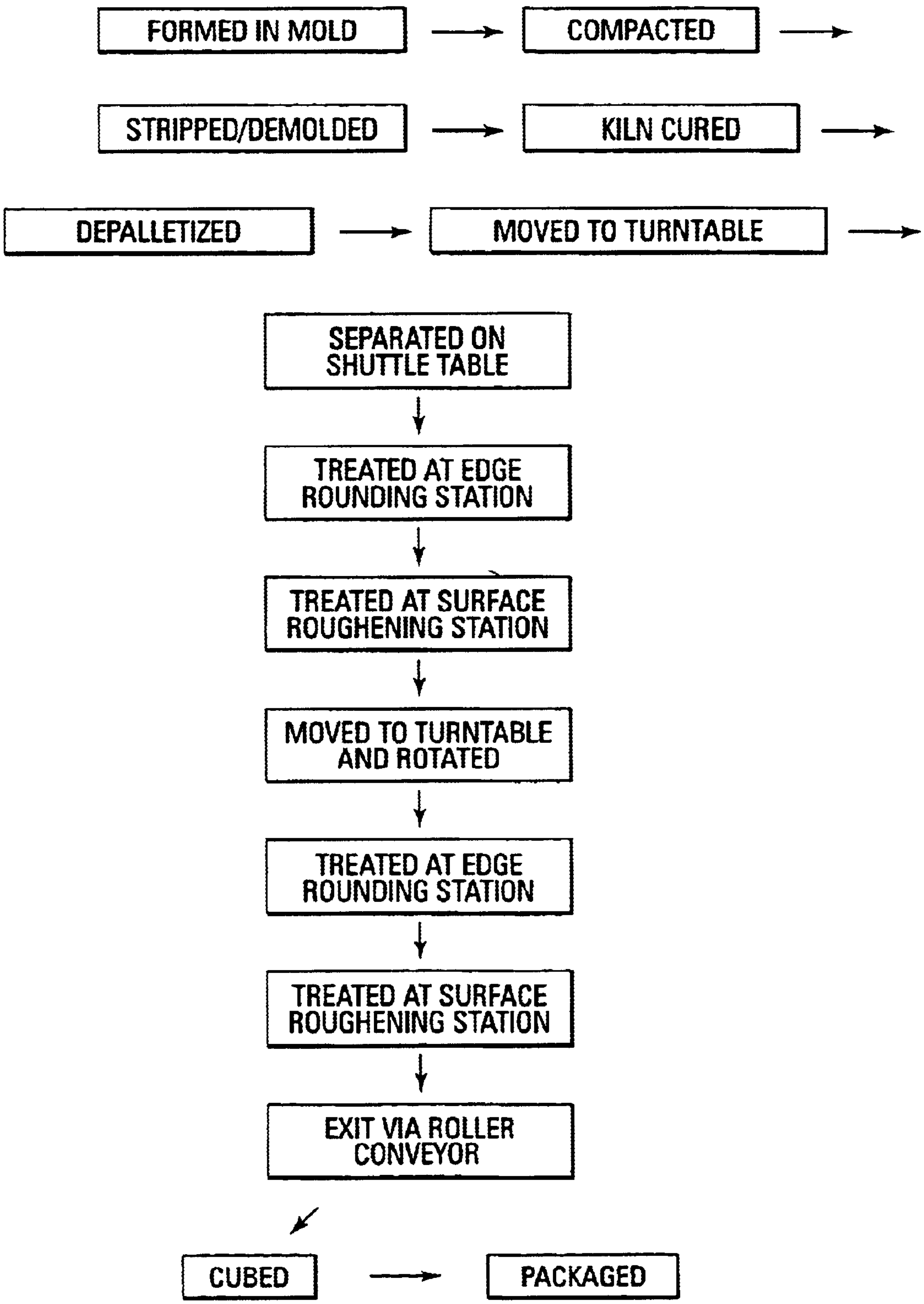
FIG. 1 is a flow diagram of the apparatus and method of this invention.

This invention is an apparatus and a process for creating the desired surface texture and appearance in a block. The apparatus of this invention includes means to move a block, in a desired orientation, to a hammer station that rounds the edges of the block and to a flailing station that roughens the side surfaces and faces of the block. In a manufacturing environment, the process is automated and moves as rapidly as possible in order to increase the amount of product which is produced by the process. One of skill in the art understands that automation is not an essential feature of this invention.

When blocks are used to construct a wall, they may be of differing shapes and sizes. When blocks are manufactured, they are configured to be compatible with each other in the construction of a retaining wall, a parapet wall, or a free-standing wall. As is well known in the art, concrete retaining wall blocks are typically made using dry-cast concrete block-making equipment, which uses a single mold and a multitude of steel manufacturing pallets to mass-produce such blocks. The blocks are formed in a mold, on a steel pallet, in the block machine which compresses and vibrates the concrete mix. The blocks are then stripped out of the machine on the steel pallet, and then transported on the pallet to a curing room or station. Typically the block forming process lasts only a few seconds, and the primary curing stage lasts approximately 24 hours, though the blocks continue to cure after leaving the curing stage. After the curing stage, the blocks are then transported to a station (depalleter) that removes the steel pallet. The steel pallet is returned to the block machine and is reused for making new product in a continuous cycle. At this point, the blocks may be split or they may be treated using the apparatus and method of the present invention. The blocks are then configured into a cube on a wood or plastic delivery pallet and placed into inventory for ultimate shipment to the customer. Because the production process relies on continuously cycling the manufacturing pallets back to the machine, it is important that the downstream production processes keep pace with the block machine to avoid any bottlenecks that would slow the overall production rate of the plant. As a result, the set of blocks produced by the molds is typically passed into the apparatus of this invention as a set. Of course, one block at a time can be placed into the apparatus.

Blocks shown in the FIGS. 2 to 4 and 11A are substantially similar to those shown and described in commonly assigned, co-pending U.S. application Ser. No. 09/904,038 (entitled "Multi-Channel Retaining Wall Block And System") hereby incorporated herein in its entirety by reference. These blocks have substantial open cores to provide for internal grout and rebar reinforcing. The apparatus described herein is intended to treat a wide variety of blocks for varying end purposes and any shape of block can be treated in the manner described herein by adjusting the apparatus to accept the block (as described, for example, in FIGS. 12A to 12F). For example, the block may be substantially square, substantially rectangular, or may have a complex shape. In any case, one or more surfaces of a block may be treated by the method and apparatus described herein. The blocks illustrated herein have been shown to be particularly suitable and versatile in the construction of retaining walls. Because a natural appearance is desirable for such walls, the method and apparatus of this invention is particularly desirable and useful for producing blocks having a desired appearance.

The terms "upper" and "lower" are used when describing these blocks and typically refer to the orientation of a block when it is placed in a retaining wall. The figures illustrate blocks having an upper surface opposed to a lower surface. The lower surface is separated from the upper surface by the thickness of the block. First and second opposed faces are substantially parallel and first and second opposed side surfaces are non-parallel. The first and second faces are orthogonal to one of the side surfaces. The first and second faces join the upper and lower surface of the block to form edges. Similarly, the first and second side surfaces join the upper and lower surface of the block to form edges. The blocks may have a through-passage or core, as well as pin-receiving apertures. The lower surface of the block may have one or more channels used to receive the head of a pin.

Blocks such as these comprise concrete and typically and preferably are formed in a mold that assists in producing desired surface textures such as those described above. In addition, for the blocks shown and described in commonly assigned, co-pending U.S. application Ser. No. 09/904,038, it is preferred that at least three of the blocks, of varying sizes, are formed at one time. Such blocks preferably are made using the technique described in and adapted from U.S. Pat. Nos. 5,078,940 and 5,217,630 (both to Sayles), hereby incorporated herein by reference in their entirety, whereby an irregular, roughened surface is imparted to the faces and side surfaces of the block. To impart a roughened surface, one mold is provided with three mold cavities each having a plurality of projections. The necessary core forming, pin-hole forming, and channel-forming elements or features are used along with the mold. Each mold cavity is filled with uncured block material (e.g., concrete). A portion of the material is retained in place near the cavity walls when the block is removed from the cavity, and this produces a textured surface.

At the end of the molding cycle, the block is stripped out of the mold and carried on the steel manufacturing pallet, which transports the blocks typically using a roller conveyor line to a curing station, typically a kiln, where the blocks remain for a time at temperature and moisture conditions designed to facilitate curing of the blocks. Typically the blocks are removed from the curing process within 24 hours and are then transported to a station that removes and recycles the manufacturing pallet. The blocks then are introduced into the process and apparatus of this invention.

Figures 2A, 2B:
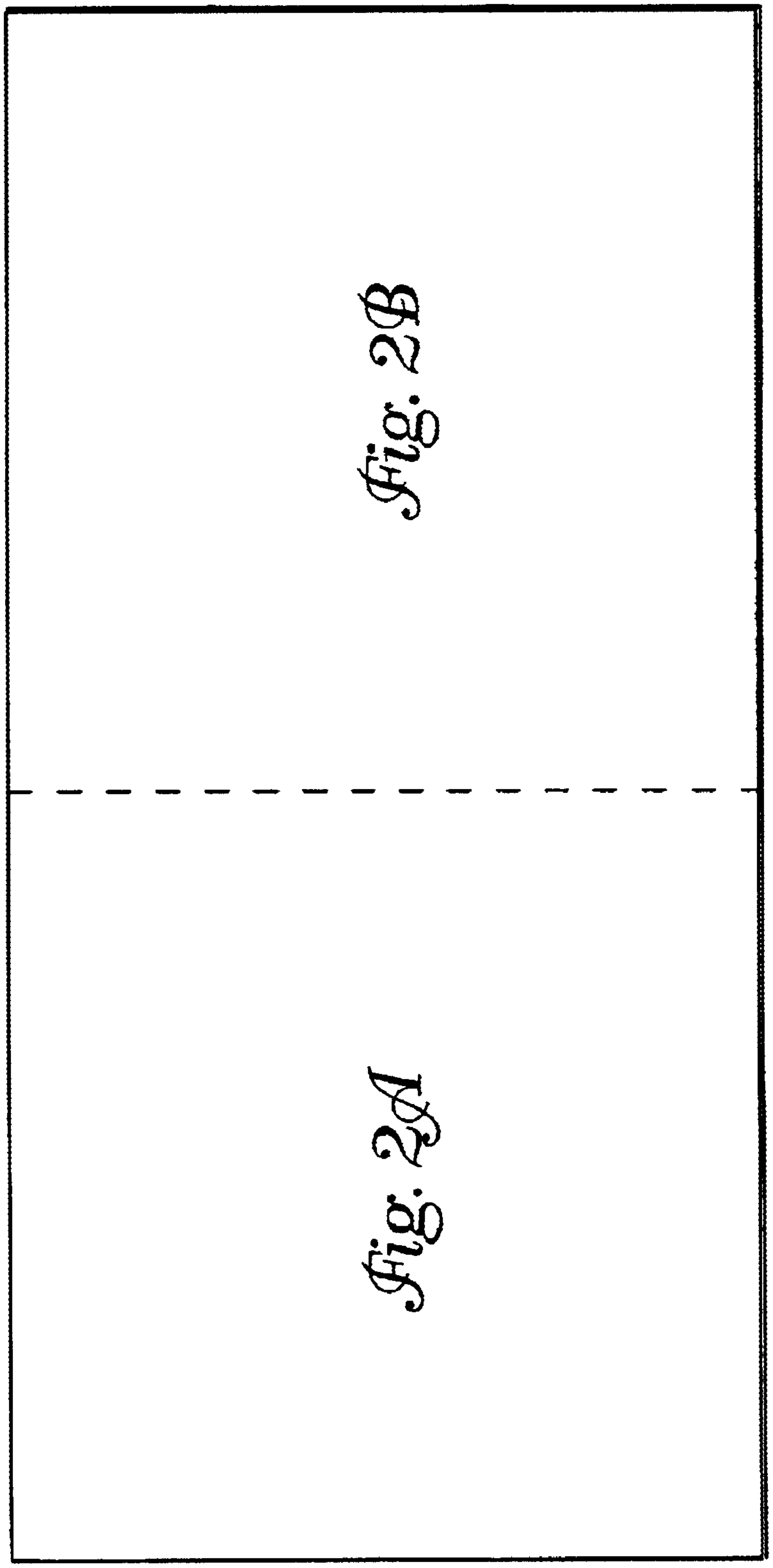
FIGS. 2A and 2B together form a top view of the surface treating apparatus of this invention.

FIG. 1 is a flow chart illustrating the making and treating of the blocks. Blocks are formed and compacted, then removed from a mold. Preferably at least some of the faces and side surfaces of the block have a desired texture due to the process of forming the block, as described above. The blocks need to be cured before further treatment and this typically is done while they are on the steel pallet in a large kiln. After curing, they are depalletized for further treatment. One or more blocks is moved onto a conveying means, such as a slider plate, roller conveyor, or conveyor belt, which, along with a pushing means, moves the block or blocks to the apparatus. When multiple blocks approach the apparatus, it is necessary to separate them and place them into the apparatus one unit at a time. A unit may comprise two blocks. Such is illustrated in FIGS. 2A and 2B and described further below. In this apparatus, it is convenient to use a turntable to position the blocks for entry into the apparatus. The blocks are moved onto the turntable, oriented, pushed from there in a desired orientation onto a shuttle table, and then pushed, one unit at a time, onto the slider plate. Pushers urge blocks along the slider plate and into an edge rounding station, where hammer elements round the edges of a block. The hammer elements can be configured such that edge corners are rounded, such are described further below. The block is held stationary while at the edge rounding station to prevent undesirable movement. It should be noted that typically (and desirably) the length of time a block is in an edge rounding station is a few seconds. The block is pushed from the edge rounding station along the slider plate and into a surface roughening station, which textures the side surfaces and blends in any marks created in the hammer station. Typically and desirably a block moves continuously through the flail station to ensure that the surfaces are treated uniformly. The flail elements also act to urge the block forward. The result is an even texture and color on the treated surfaces of the block. Typically two sides are treated at one time in either the edge rounding station or the surface roughening station, and then the block moves to a second turntable, which rotates the block so that the untreated sides are now exposed to a second set of treatment stations. A pusher moves the blocks into the second edge rounding station. By this time, many blocks are lined up in the apparatus and downstream blocks are pushed along by the blocks behind them.

All four sides of a block can be treated by moving the blocks through the first treatment stations, rotating them, and moving them through the second treatment stations. Once the treatment of the block has reached the desired end point, the blocks are moved further along the slider plate, (e.g., pushed along), to exit the apparatus. A roller conveyor is convenient to use to move the blocks away from the apparatus, to be configured and stacked (i.e., cubed) and packaged for shipping. A pushing means can be used to move the blocks along, the roller conveyor can be inclined so that gravity urges the blocks forward, or the roller conveyor can be mechanically driven (motorized) to move the blocks forward.

The pressure and depth of penetration of the hammer elements and the flail elements are adjustable so that the appearance of a block can be varied or so that the apparatus can accommodate many sizes and shapes. If desired, only one edge of one side of a block or only one side of a block can be treated by disabling the other hammer elements and flail elements.

FIGS. 2A and 2B illustrate the process and apparatus of this invention, showing blocks oriented in a desired direction to be treated in two types of treatment stations, one having an edge rounding member (e.g., a hammer element) and the other having a surface roughening member (e.g., a flail element). Arrows indicate the direction of movement of the block. A block is pushed along on slider plate 20 by transfer bars that move the block at a desired rate and interval. Once on the slider plate, a block is moved between first stations 30 and 31 which together form a first treatment station. Stations 30 and 31 are edge rounding stations, where the edges of the block are rounded by the action of an edge rounding member. Such a member includes materials sufficiently hard to strike the block and remove block material at the edge. It has been found that hammer elements are particularly suitable for removing material. These hammer elements swing in an arc and they are adjustable so that the desired amount of material at the edge of the block can be removed. Preferably, both the top and bottom edges of two opposing sides of the block are rounded by the action of the hammer elements. The hammer elements may be controlled hydraulically or electrically, but preferably they are pneumatically controlled hammer elements. The height of the hammer elements can be adjusted depending upon the size and thickness of the block. A clamp (illustrated below), also preferably pneumatic, immobilizes the block during the hammer operation. The block is guided to and through each station by adjustable side guide rails (illustrated below).

As seen in FIG. 2B, the block is next moved to and through a second treatment station where it is impacted upon by the second stations 50 and 51 which together form the second treatment station. Stations 50 and 51 comprise surface roughening members. Such a member can be any material sufficient to roughen the surface of the block. Particularly effective is a flailing station comprising flailing elements, described further below, which roughen, texture, or deface the surfaces of opposing faces of the block. The flailing elements are electronically sequenced to be active and functioning while the blocks are being pushed through them by means of the pusher bar. The blocks continue to move along the slider plate 20 by means of the pusher bar until reaching the turntable. At this point the block may be re-oriented to bring the unfinished faces into position for additional treatment at stations 70, 71 and 92, 94 if it is desired to treat additional surfaces of the blocks. After the blocks have passed through the second set of treatment stations, they are pushed along by subsequently treated blocks onto a roller conveyor. Treated blocks are placed on a shipping pallet in a packaging station and arranged in a desired configuration for shipment to the customer.

This process also can be used to treat only one side of the block, by using only one side of one edge rounding station and one side of one surface roughening station. The process can be used to treat only one edge of one side of the block also. Typically it is desirable, and more economical, to treat two sides, and their four edges, at one time. In addition, one treatment station may be used, for example, to treat all block edges, by rotating the block within one station. Alternatively, the side surfaces and faces of a block can be treated sequentially by treating the block in a first hammer station and first flail station, rotating it, and placing it through a second hammer station and a second flailing station, as shown in FIGS. 2A and 2B.

The preferred embodiment of this invention will now be described with reference to FIGS. 2A and 2B. Together they form a schematic illustration showing multiple blocks being treated. Groups of three blocks (i.e., group 10 of blocks 1A, 1B, and 1C) are moved from a pallet onto station 11. The blocks are pushed onto turntable 12. The blocks can be rotated, if necessary, to the desired orientation for entering the apparatus. The group of blocks is pushed off the turntable to shuttle table 13 where the group of three blocks is separated by hand or by a side to side first pushing means (not shown) as part of the shuttle. Once aligned correctly, the first element of the pusher bar advances the first block(s) onto the slider plate in preparation for the texturing in the first hammer station. This is then followed in similar fashion by the remaining block(s). In this illustration, blocks 1B and 1C form a rectangular unit, so these blocks are treated together. The net result is that only three surfaces and three top and bottom edges of blocks 1B and 1C are treated. Typically the non-parallel side surface of these blocks does not face a viewer when these blocks are used to construct a wall. It is to be understood that the blocks could be separated and passed though the apparatus one at a time.

Figure 4:
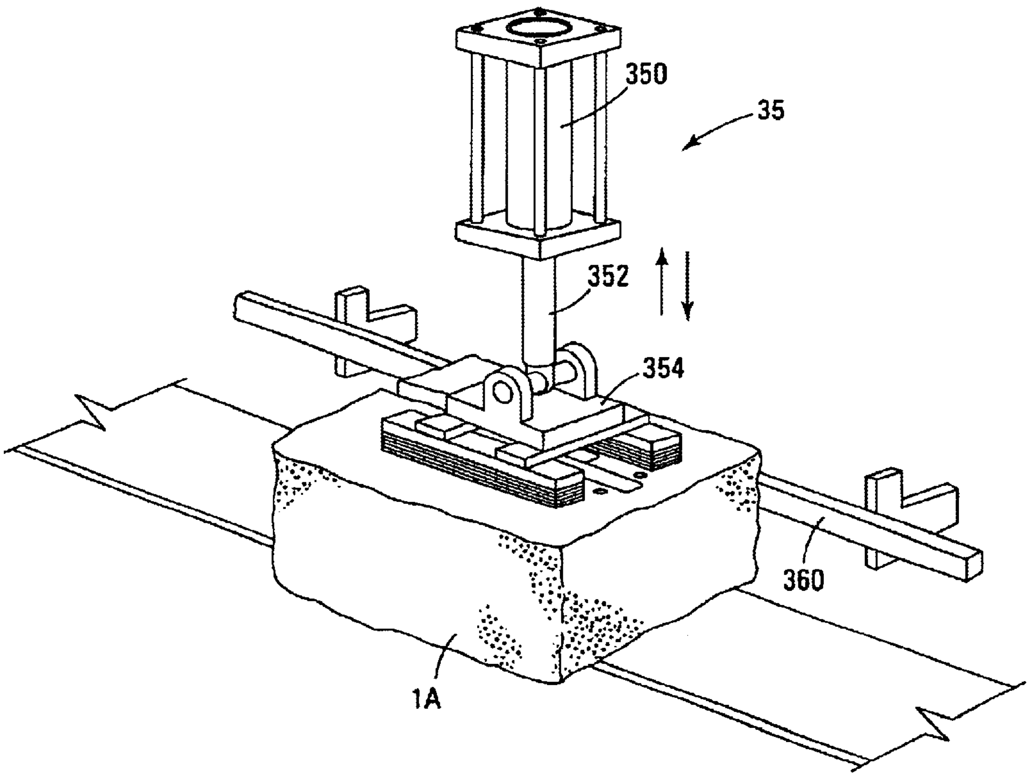
FIG. 4 is a perspective view of a block and a holding clamp of the surface treating apparatus.

Thus, one unit of blocks, (i.e., 1B and 1C) and single block 1A enters the apparatus at one time. The block or blocks move on slider plate 20 between first hammer stations 30 and 31, as shown in greater detail in FIG. 7. Slider plate 20 comprises any suitable material, such as steel. A transfer or pushing bar (similar to the first pushing means) moves blocks into the hammer station where they are held, by means of an overhead pneumatic clamp 35 (as best seen in FIG. 4), motionless long enough for the hammers to strike the edges of the blocks. A set of hammer elements (i.e., a set being two hammerheads and their hammer teeth, one for the upper edge and one for the lower edge of the block) 32 and 34 strike the top and bottom edges of a first face of the block and simultaneously a second set of hammer elements 36 and 38 strike the top and bottom edges of the second face of the block, thus rounding the edges of the block. The figures illustrate two sets of hammer elements for each face of the block, although a hammer element could be configured so that only one set is needed. Further, the apparatus can be programmed so that only one set of hammer elements is activated.

Hammer elements 32, 34, 36, and 38 move through circular arcs that intersect the edges of the block. The hammer element height and range of motion are adjustable to accommodate various heights and widths of blocks, and the apparatus can be programmed to cause the hammers to strike the block as many times as desired to allow blocks of varying hardness to be treated successfully.

Once the edges of the opposing faces of the block have been rounded, clamp 35 is released and support rail 200 with pushing bar 14 activates to push the block or blocks forward on slider plate 20 through first flailing stations 50 and 51, shown in FIG. 2B. The flailing station comprises flailing elements that are designed to roughen, or texture, the faces and side surfaces of the blocks. It is to be understood that various configurations and materials can perform this function. Any material hard enough to texture the surface of the block is suitable, and include metal (e.g., steel) and ceramic. This material may be in the form of chains, ball bearings, hex nuts, cylinders, and the like. The flailing station typically consists of a motor driven spindle or axle to which hex nuts or other flail elements are attached. The flail elements are attached to the spindle through flexible means that allow them to move, such as chain links, cable, wire or other like means. As an alternative, rotating wire bristles or other rotating or oscillating heads may be substituted for flail elements. In general, any means of abrading the surface of the faces or side surfaces will suffice. First flailing stations 50 and 51 comprise rotating heads 52 and 54, respectively. Each rotating head 52 and 54 has shaft 55 with an axis of rotation in a vertical plane. It would also be possible to operate the rotating heads on a horizontal axis of rotation or any angle in between vertical and horizontal. About this axis are mounted chains having hardened steel hex nuts attached to them. The impact of these metal parts against the face of the block textures and roughens the surface of block. It also blends in any hammer strike marks that are present from the edge treatment and results in an even color and texture of the face of the block with the edges, resulting in a uniform appearance.

The block or blocks move from the first flailing station to turntable 15 which rotates the block 90 degrees so that the side surfaces of the blocks can be treated. (For a non-rectangular block (such as those illustrated in FIGS. 12B to 12F), the rotation could be any desired amount.) In a production mode, the turntable is controlled electrically. The block or blocks could be moved by hand, but it is safer and faster to do this automatically. A hydraulic pusher moves a block or blocks into position. The blocks move into position between the second hammer stations 70 and 71 so that the sides of the blocks face hammer sets 72 and 74. These hammer sets move through a circular path to strike the upper and lower edges of the block, thus rounding the edges, as described above.

The blocks continue to move from hammer stations 70 and 71 into the second flailing stations 90 and 91, in which rotating heads 92 and 94 (respectively) texture the side surfaces of the block in the manner as described above for flailing stations 50 and 51. A block is urged along by the blocks behind it pushing it through the various stations.

The blocks move further through the apparatus to end station 100 at which point the blocks are in the same orientation as when they entered the machine. This is optimal for loading the blocks onto a pallet and thence for shipment to a customer.

Figure 2A:
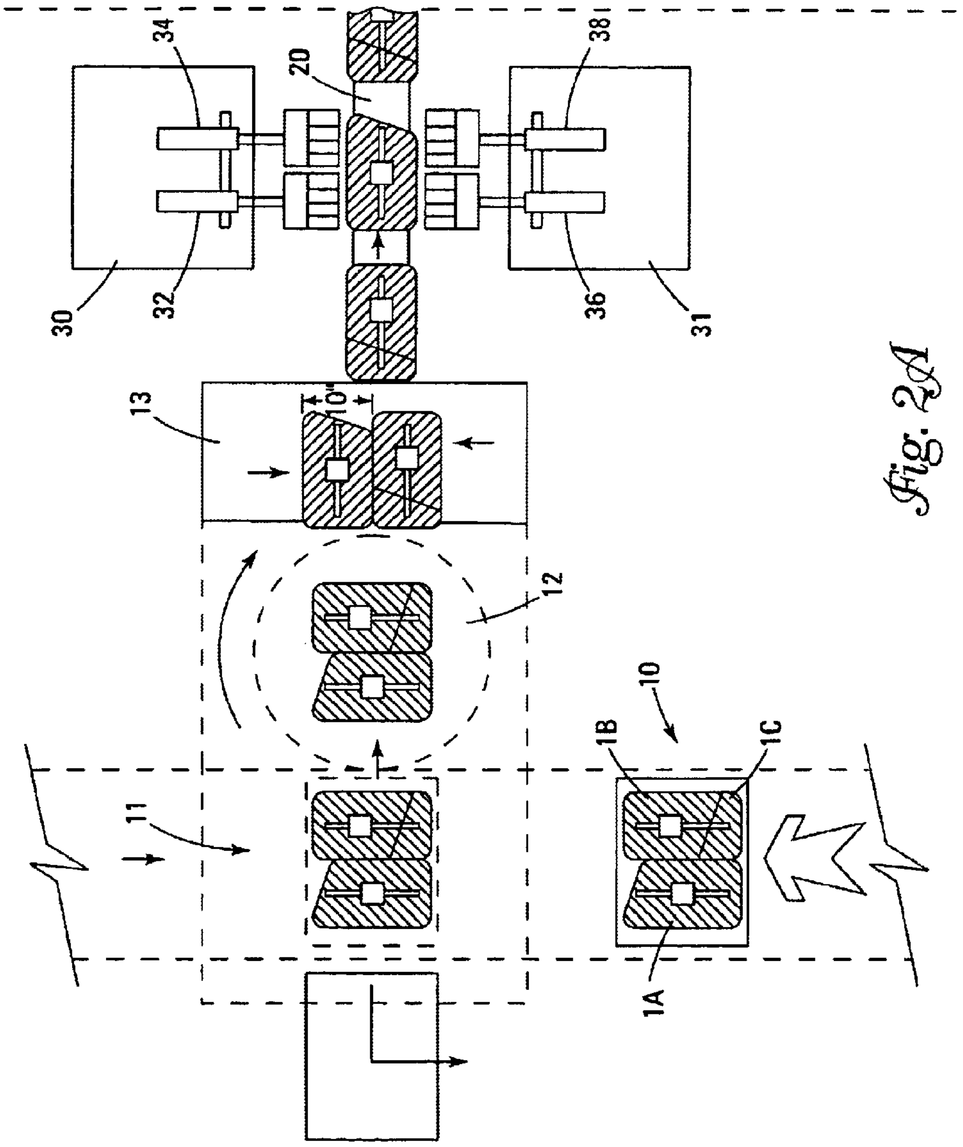
Figure 2B:
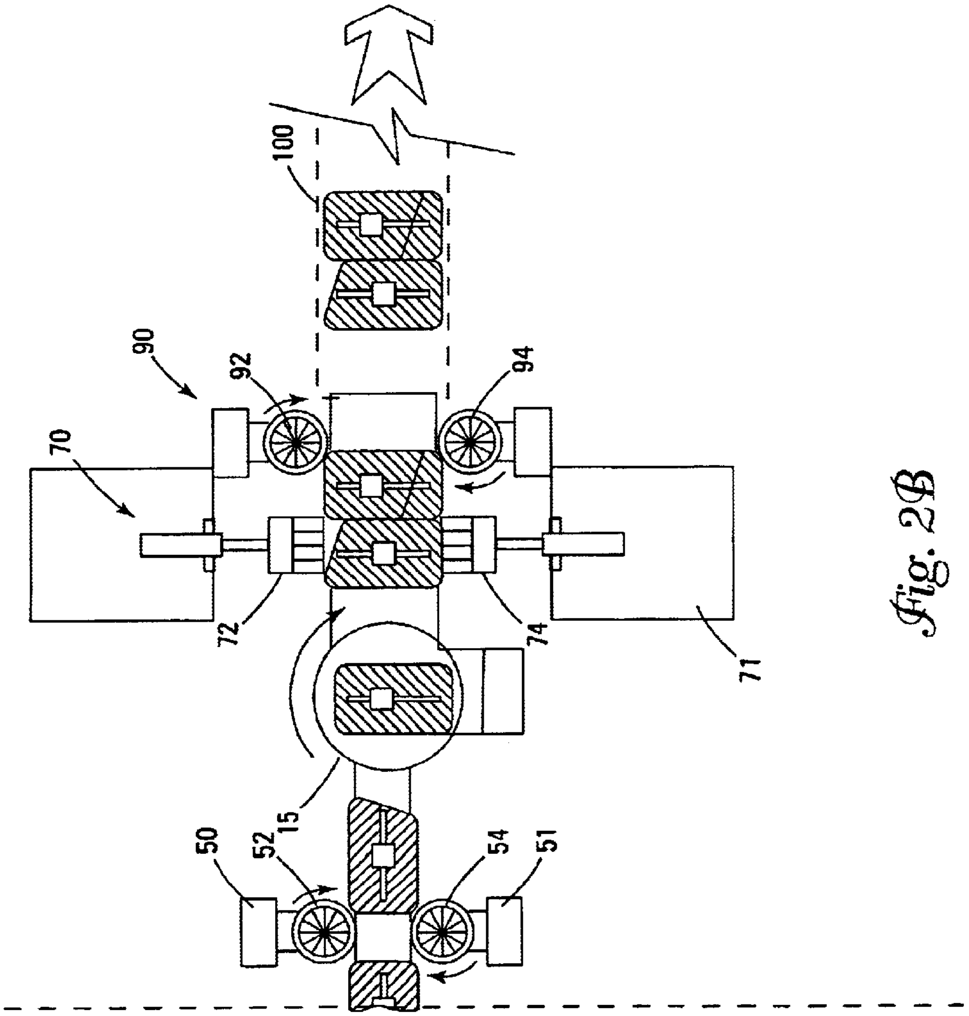
Figure 3:
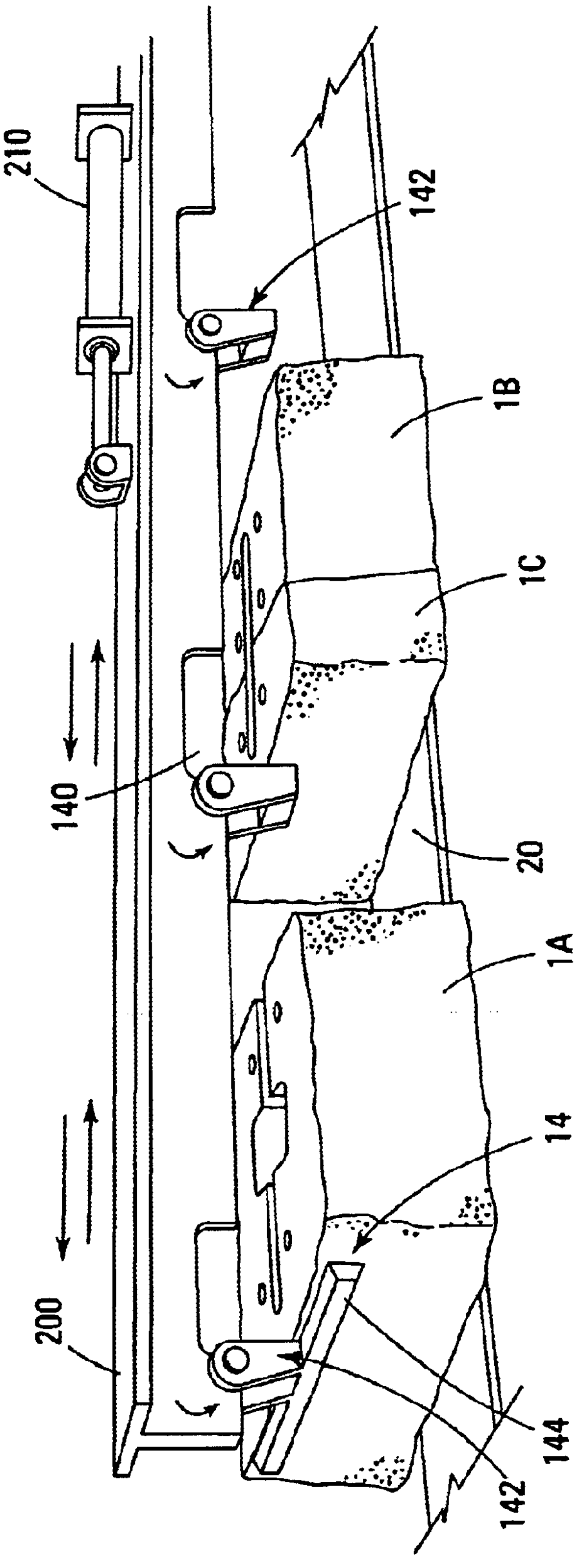
FIG. 3 is a partial perspective view of a pusher and a support rail for the surface treating apparatus shown in FIGS. 2A and 2B.

FIG. 3 is a perspective view of a portion of the apparatus shown in FIG. 2 in greater detail, illustrating blocks 1A, 1B, and 1C moving along the slider plate as pushers mounted to a support rail capture a block and push it along the slider plate. The support rail and its pushers are used to move the block into the first hammer station and first flail station. The blocks move under support rail 200, which is provided with hinged pusher element 14, comprising hinged portion 142 and horizontal pusher "bar" 144. Typically the lead or first pusher has a horizontal pusher bar 144 and subsequent pushers have hinged portion 142. Pneumatic cylinder 210 is operably connected to the support rail, pushing and pulling it along the path of the blocks, as indicated by the arrows. Recess 140 in support rail 200 may be used to permit hinged pusher 14 to move out of the path of a block if required. Hinged portion 142 can swing up and out of the way of a block as it passes beneath. This support rail can be used anywhere a pusher is needed to move a block. However, this arrangement is most convenient to push the blocks into the first hammer and flail stations.

FIG. 4 illustrates holding clamp 35 holding block 1A securely at the hammer station. Clamp 35 comprises pneumatic cylinder 350, cylinder 352, and base 354. The cylinder moves up and down as necessary, as indicated by the arrows, to clamp a block in place. The block is shown next to side guide rail 360, which is preferably adjustable in height. Typically guide rails on two opposing sides of the block are provided; only one is shown in this figure. The guide rails prevent misalignment of blocks and serve to orient the block properly for movement through the surface treating stations.

Figure 5:
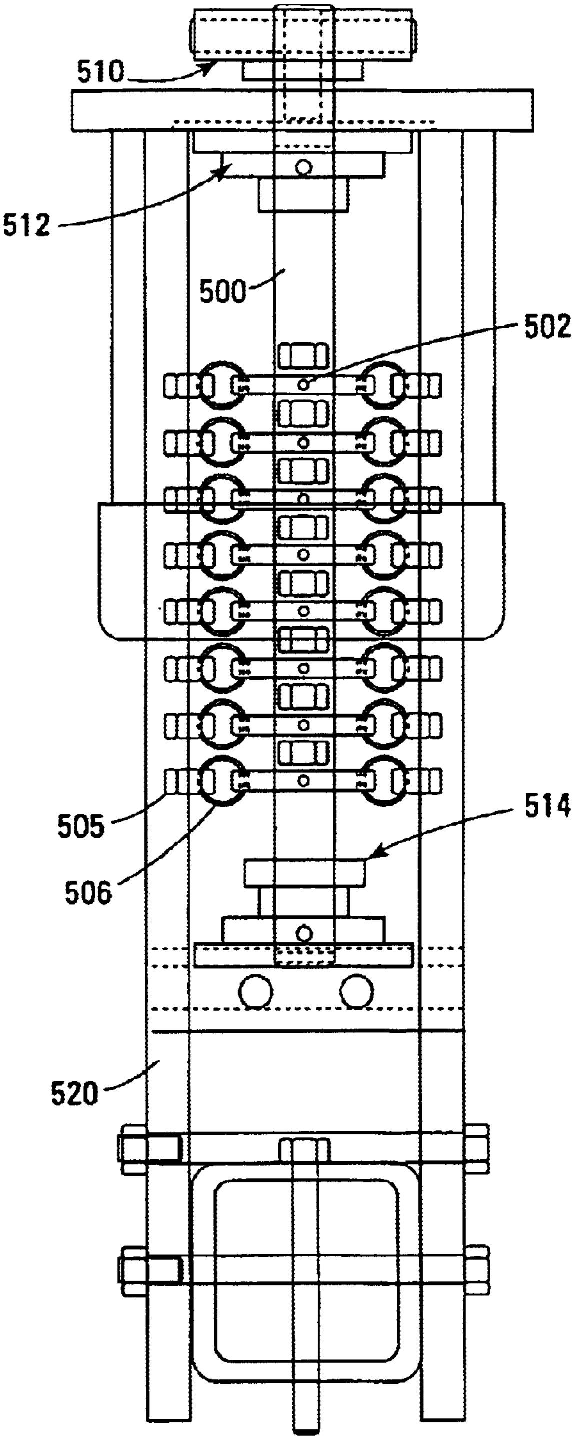
FIG. 5 is a side view of the flail station of the apparatus of FIG. 2.
Figure 6:
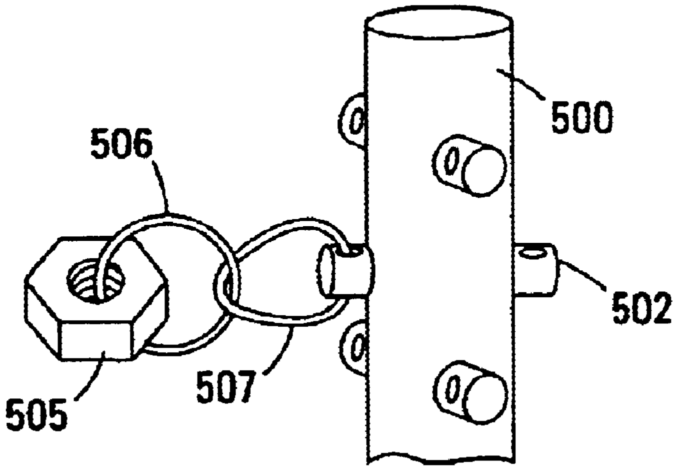
FIG. 6 is a detailed perspective view of a portion of the flail station shown in FIG. 5.

FIG. 5 shows a side view of rotating head 52 of flailing station 50. The rotating head is mounted on support frame 520. Rotating head 52 comprises rotatable vertical shaft or spindle 500 which turns about bearings 510, 512, and 514. The spindle is operably connected to a motor (not shown) designed to rotate the spindle at the desired rate. Cross bars (or fastening points) 502 are mounted to spindle 500. Flail elements 505 are attached to cross bars 502 by rings 506. In this case, the flail elements are steel hex nuts. These are sufficiently hard to texture the surface of the block. FIG. 6 illustrates a detail view of flail elements 505 attached to cross bar 502 by two interlocking rings, 506 and 507. Ring 507 passes through a hole, via, or passageway in the cross bar and interlocks with ring 506, which itself passes through the hex nut. The rings and the hex nuts allow for rapid replacement in the event of wear and for reconfiguration of the flail element if a different appearance to the block is desired.

It should be understood that the flail elements could be constructed in many different ways to accomplish the desired result. All that is required is that the flail elements be hardened objects that may be attached to the spindle in a manner allowing them to move about randomly after striking the block surface. This allows the flail elements to bounce around and give the block surface a random appearance which is more desirable than a repeating pattern which would result from use of a set fixture.

Figure 7:
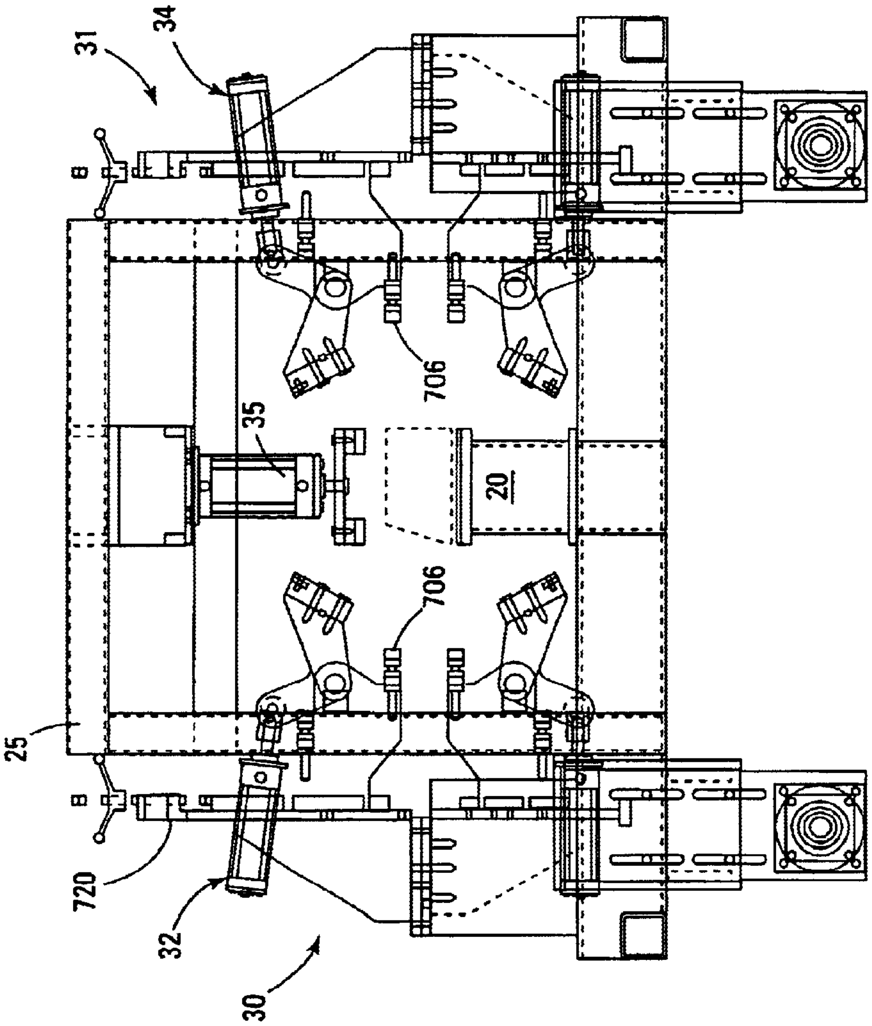
FIG. 7 is a cross section view of the hammer station of the apparatus of FIG. 2.
Figure 8A:
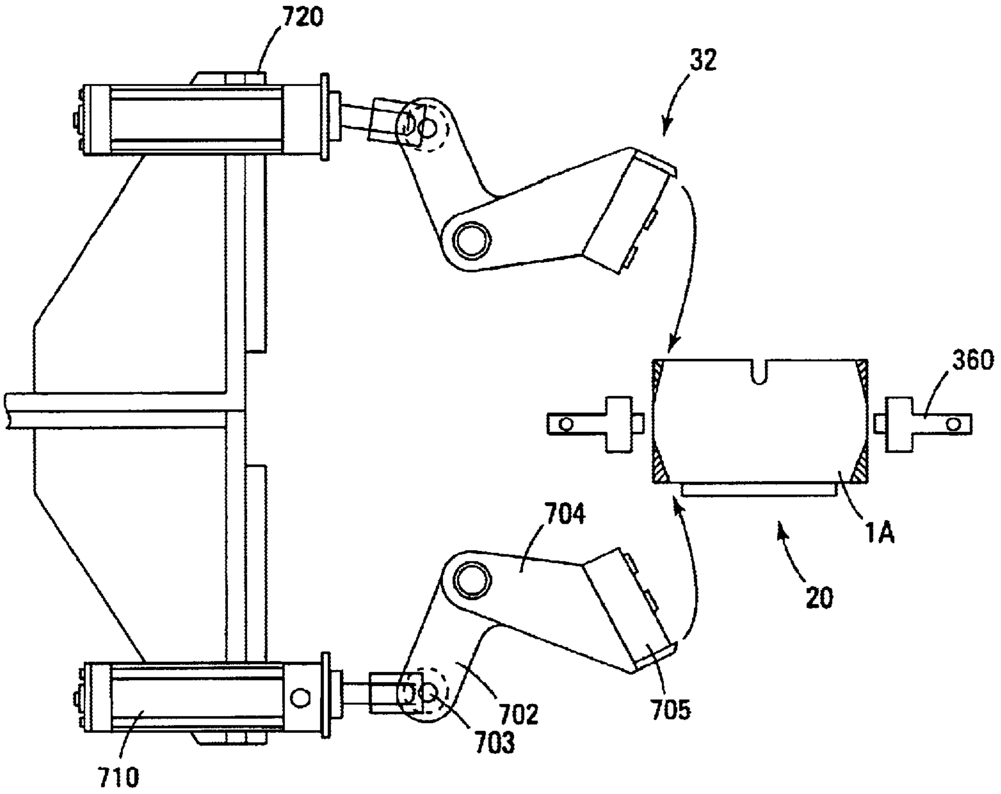
FIG. 8A is a side view and FIG. 8B is a perspective view of a portion of the hammer station of FIG. 7.

FIG. 7 shows a side view of a hammer element station (e.g., stations 30 and 31 and/or 70 and 71) positioned within apparatus frame 25. A block is shown in outline in the station, with clamp 35 above it. The block is held on slider plate 20. The hammer element station has multiple sets of hammers (i.e., as shown in this embodiment there are four hammer elements in total) so that the top and bottom of two opposing sides of a block can be treated at the same time. FIG. 8A shows one set of hammers adjacent a block disposed on plate or conveyor 20 and between rail guides 360. The hammer elements are connected to pistons 712 that are mounted in frame 720. Hammer element 700 comprises hinge or pivot portion 702 and hammer arm 704 to which is affixed hammer 705 having cutting teeth segment 707, described in greater detail below.

Figure 8B:
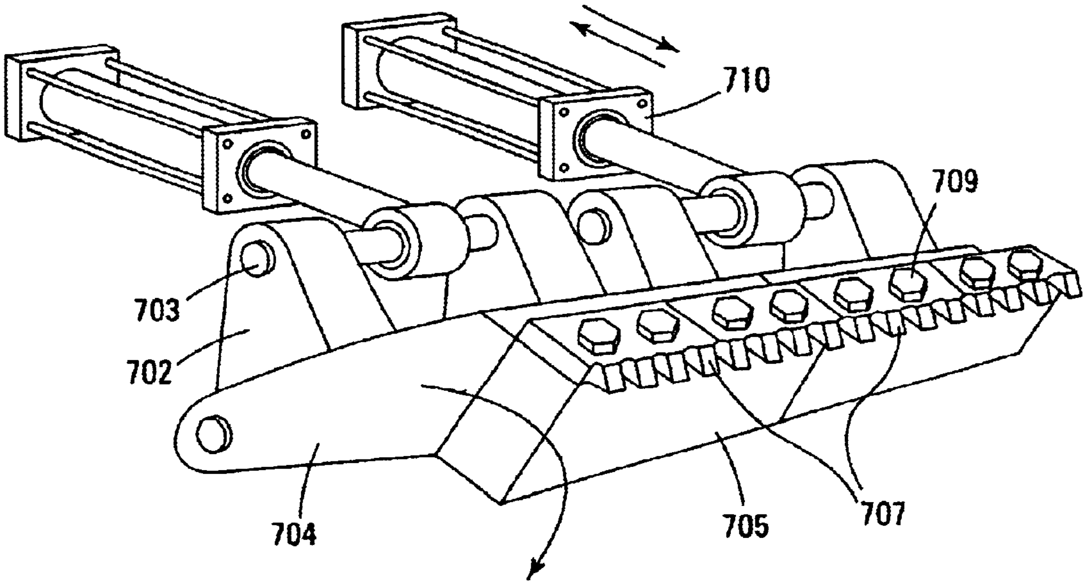

Hammer element 700 attaches to pneumatic cylinder 710 and pivots about rod 703, as best seen in FIG. 8B. The arrows indicate the motion of the pneumatic cylinder. The pivot produces a swinging motion to the hammer element, as indicated by the curved arrow. The hammer element can swing until they encounter cushioned stops 706. The position of these stops and cushioning capacity is adjustable. FIG. 8B also shows that cutting teeth segment 707 is affixed to hammer portion 705 by means of fasteners 709. The teeth segments may be fastened by any means desired, or the teeth segments could be integrally molded or machined into the hammer portions. Removable cutting teeth segments are convenient as they can be replaced as they wear, or they can be changed to alter the shaping of the block by the teeth.

Figure 9A:
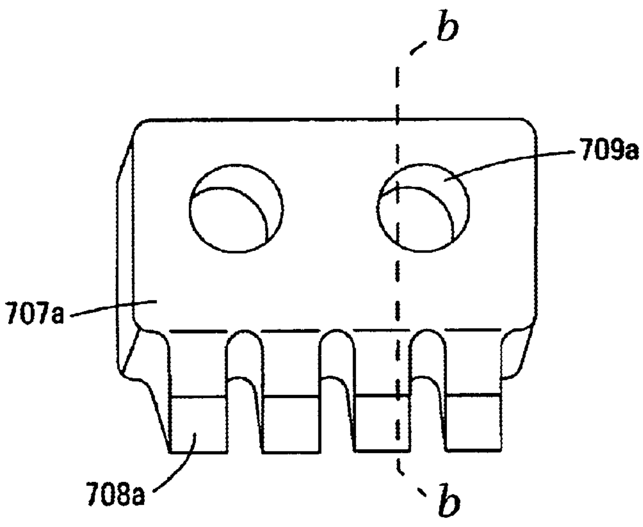
FIG. 9A is a perspective view of one embodiment of the hammer element and FIG. 9B is a side view of the hammer element fastened to the hammer body.
Figure 9B:
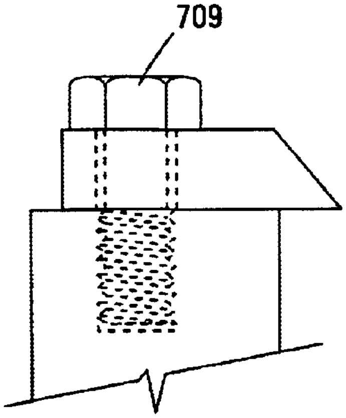

FIG. 9A shows detail of the cutting teeth segment 707*a*. In this embodiment, the cutting teeth segment is linear, i.e., teeth 708*a* are of even length. FIG. 9B is a cross-sectional view along line b—b in FIG. 9A and illustrates the angular profile of one of the teeth. It has been found that a variety of surface textures may be imparted by varying the design of the hammer teeth.

FIGS. 10A and 10B show perspective and top views of an alternate embodiment of cutting teeth 717*a* in which the cutting teeth segment is curved or arcuate as shown best in top view (FIG. 10B). Teeth 721*a*, 721*b*, 721*c*, and 721*d* are all of substantially the same shape, but of different length. The cross sectional profile of an individual tooth is similar to that shown for a tooth in FIG. 9B. FIGS. 10C to 10J show other embodiments of the cutting teeth. FIGS. 10C and 10D illustrate a solid (non-segmented) straight tooth, 717*b*, and FIGS. 10E and 10F show a wedge, saw-cut shaped segment 717*c*. FIGS. 10G and 10H show teeth with a wedge, saw-cut arc shape 717*d* and FIGS. 10I and 10J show segment 717*e* having irregular length and width teeth.

Figure 11A:
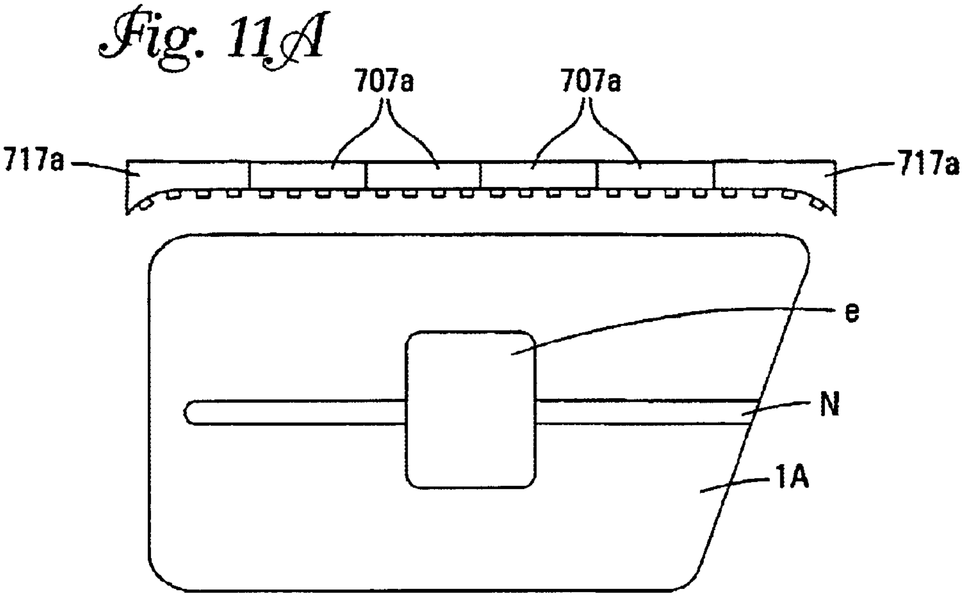
FIG. 11A is a top view of a block showing hammer segments next to the block.
Figure 11B:
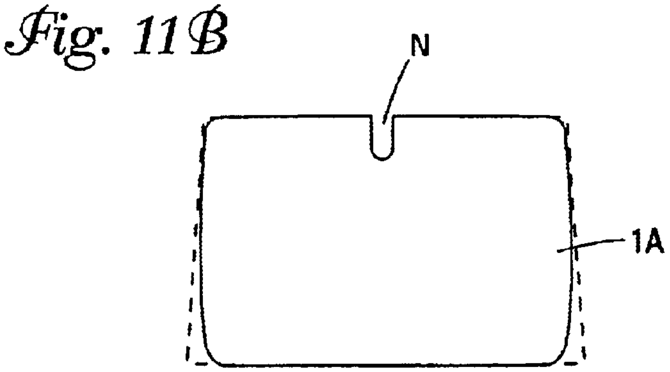
FIG. 11B is a cross section view of a block showing the shape of the block as manufactured (dotted outline) and the final anticipated shape resulting from the texturing process of this invention (solid lines).
Figure 12A:
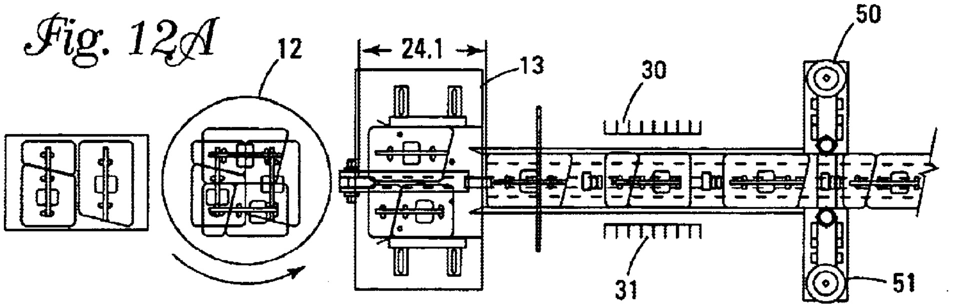
FIGS. 12A to 12F are top views of various blocks being processed in the apparatus of this invention.
Figure 12B:
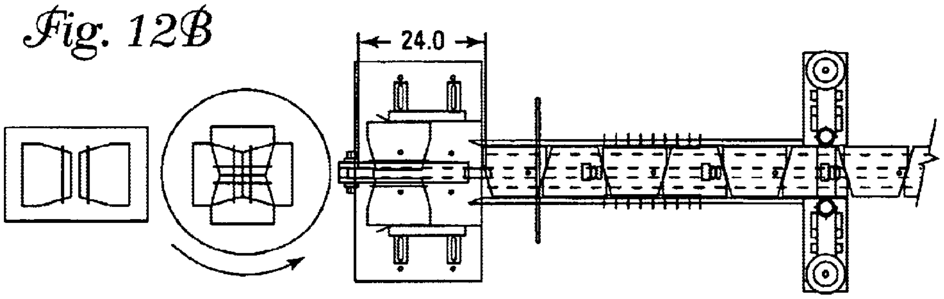
Figure 12C:
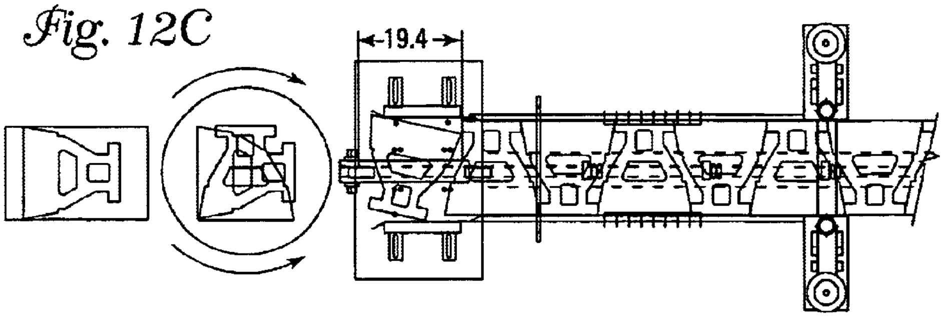
Figure 12D:
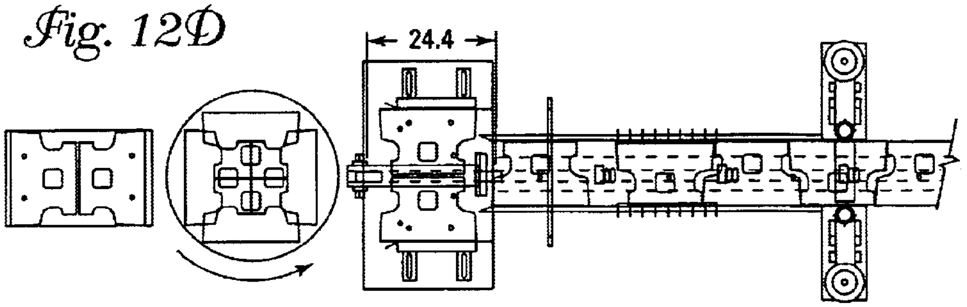
Figure 12E:
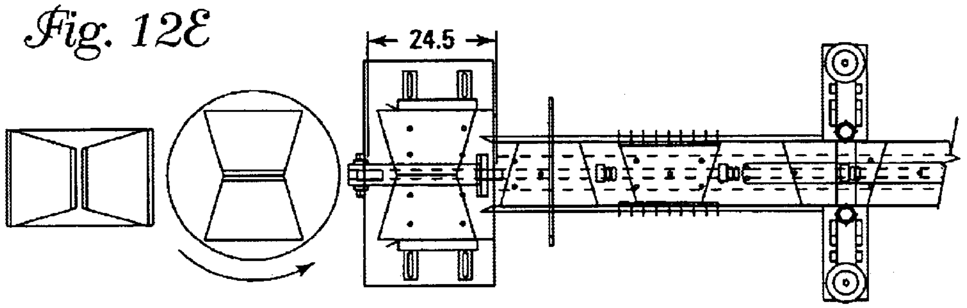
Figure 12F:
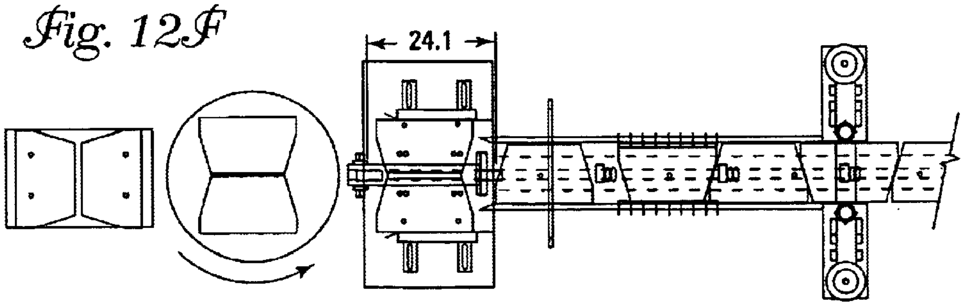

FIG. 11A illustrates the position of hammer teeth segments 707*a* and 717*a* (positioned at the corners) adjacent an edge of block 1A. Block 1A has core C and channel N. When this block is used in a wall, the channel typically faces down, so this view shows the bottom of the block. For simplicity, the drawing shows the hammer elements on only one side of the block. The curve of arcuate segment 717*a* is designed to treat the edge at the corner of a block. Thus the block edge corners get contoured. In this way, the block has a more natural stone-like appearance after treatment. FIG. 11B shows an end view of the block and that the shape of the block is altered after treatment. The original shape of the block, which typically is tapered in the manufacturing process, is shown in phantom (dotted lines). More material tends to be removed from the top of the block, facing down in this drawing, and the final treated block shape is more symmetrical, generally the faces of the block are convex in appearance.

FIGS. 12A to 12F illustrate various block styles being treated in the apparatus. Only a portion of the apparatus is shown. The blocks move onto turntable 12 to be oriented, to shuttle table 13 to be separated and then they move onto the slider plate 20. The blocks continue to move until they are positioned between first hammer stations 30 and 31, where the edges are treated, and first flail stations 50 and 51, where the faces are treated. These figures show how the blocks can be efficiently processed regardless of their shape or size. The apparatus is adjustable so that the desired surface effects can be produced. FIGS. 12B to 12E also illustrate blocks particularly unsuitable for texturing by tumbling processes. That is, these blocks have features, such as lips on the back faces of the blocks shown in FIGS. 12B and 12E, and complex shapes, with internal open cores, shown in FIGS. 12C and 12D, that would be destroyed in a tumbling process. Thus the surface treatment method and apparatus of this invention is particularly suitable and desirable for these types of blocks.

For safety reasons, when the apparatus is in operation, a safety fence or guard will be in place around the moving parts. The fence or guard is connected to the electronic controls of the apparatus to automatically stop the machine function if the safety circuit is interrupted. In addition, because the process generates some negligible amounts of dust, an air filtration and (or) dust collection means may be used.

The texturing apparatus could be used for a block of any desired dimension. The blocks illustrated in the FIG. 12A to FIG. 12F have sizes ranging from 3 to 8 inches (7.6 to 20.3 cm) in height, 8 to 18 inches (20.3 to 42.7 cm) in width and 12 to 18 inches (30.5 to 45.7 cm) in length.

Although particular embodiments have been disclosed herein in detail, this has been done for purposes of illustration only, and is not intended to be limiting with respect to the scope of the claims. In particular, it is contemplated that various substitutions, alterations, and modifications may be made to the invention without departing from the spirit and scope of the invention as defined by the claims. For instance, the choice of materials or variations in the shape or angles of the blocks are believed to be a matter of routine for a person of ordinary skill in the art with knowledge of the embodiments disclosed herein.

What is claimed is:

1. A method for treating the surface of a block, the block having an upper surface opposed to a lower surface, first and second opposed faces joining the upper and lower surfaces of the block to form upper and lower face edges, and first and second side surfaces joining the upper and lower surfaces of the block to form upper and lower surface edges, the method comprising:

positioning the block in a first treatment station including an edge rounding member;

treating the block in the first treatment station to simultaneously round the upper and lower face edges of the first and second opposed faces of the block;

positioning the block in a second treatment station including a surface roughening member; and treating the block in the second treatment station to roughen a surface of at least one of the first and second opposed faces.

2. The method of claim 1 wherein the step of treating the block in the first treatment station further comprises immobilizing the block.

3. The method of claim 1 wherein the step of treating the block in the second treatment station further comprises moving the block through the second treatment station as the surface is roughened.

4. The method of claim 1 further comprising:

rotating the block within the first treatment station, and treating the block to round the upper and lower surface edges of the first and second side surfaces of the block.

5. The method of claim 1 further comprising:

rotating the block within the second treatment station, and treating the block to roughen a surface of at least one of the first and second side surfaces.

6. The method of claim 1 wherein the edge rounding member comprises hammer elements.

7. The method of claim 6 wherein the hammer elements comprise a segment having a plurality of teeth.

8. The method of claim 1 wherein the surface roughening member comprises flailing elements.

9. The method of claim 8 wherein the flailing elements comprise hardened steel elements.

10. The method of claim 1 further comprising:

moving the block to a third treatment station including an edge rounding member, and treating the block in the third treatment station to round the upper and lower surface edges of at least one of the first and second side surfaces of the block.

11. The method of claim 10 further comprising:

moving the block to a fourth treatment station including a surface roughening member; and treating the block in the fourth treatment station to roughen the surface of the at least one of the first and second side surfaces.

12. A meted for treating the surface of a block, the block having an upper surface opposed to a lower surface, first and second opposed faces joining the upper and lower surfaces of the block to form upper and lower face edges, and first and second side surfaces joining the upper and lower surfaces of the block to form upper and lower surface edges, the method comprising:

positioning the block in a first hammer station;

treating the block in the first hammer station to simultaneously round the upper and lower face of edges of the first and second opposed faces the block;

positioning the block in a first flail station; and treating the block in the first flail station to roughen a surface of at least one of the first and second opposed faces.

13. The method of claim 12 wherein the step of treating the block in the first hammer station further comprises immobilizing the block in a stationary position.

14. The method of claim 12 wherein the step of treating the block in the first flail station further comprises moving the block through the second treatment station as the surface is roughened.

15. The method of claim 12 further comprising:

rotating the block within the first hammer station, and treating the block to round the upper and lower surface edges of at least one of the first and second side surfaces of the block.

16. The method of claim 12 further comprising:

rotating the block within the first flail station, and treating the block to roughen a surface of at least one of the first and second side surfaces.

17. The method of claim 12 further comprising:

moving the block to a second hammer station, and treating the block in the second hammer station to round the upper and lower surface edges of at least one of the first and second side surfaces of the block.

18. The method of claim 12 further comprising:

moving the block to a second flail station including a surface roughening member; and treating the block in the second flail station to roughen a surface of at least one of the first and second side surfaces.

19. The method of claim 12 wherein the first hammer station comprises a segment having a plurality of teeth.

20. The method of claim 12 wherein the first flail station comprises flailing elements.

21. The method of claim 20 wherein the flailing elements comprise hardened steel.

22. A method of making wall blocks, the blocks each having an upper surface opposed to a lower surface, first and second opposed faces joining the upper and lower surfaces of the block to form upper and lower face edges, and first and second side surfaces joining the upper and lower surfaces of the block to form upper and lower surface edges, the method comprising:

forming the blocks in a mold;

removing the blocks from the mold;

positioning at least one of the blocks in a first treatment station; and simultaneously rounding the upper and lower face edges of the first and second opposed faces of the at least one block in the first treatment station without tumbling the at least one block together with other blocks in a block tumbler.

23. The method of claim 22 further comprising curing the blocks.

24. The method of claim 22 wherein the step of rounding comprises striking the upper and lower face edges with hammer elements.

25. The method of claim 22 wherein the step of rounding the edges of the at least one block in the first treatment station further comprises immobilizing the block.

26. The method of claim 22 further comprising:

rotating the block within the first treatment station, and rounding the upper and lower surface edges of at least one of the first and second side surfaces.

27. The method of claim 22 further comprising:

positioning the at least one block in a second treatment station; and treating the at least one block to roughen first and second opposed faces.

28. The method of claim 27 wherein the step of treating the at least one block to roughen the surface comprises striking the surface with flailing elements.

29. The method of claim 27 wherein the step of treating the at least one block in the second treatment station further comprises moving the at least one block through the second treatment station as the surface is roughened.

30. The method of claim 27 further comprising:

rotating the at least one block within the second treatment station, and treating the at least one block to roughen the surface of at least one of the first and second side surfaces.

31. A method of making wall blocks, the blocks each having an upper surface opposed to a lower surface, first and second opposed faces joining the upper and lower surfaces of the block to form upper and lower face edges, and first and second side surfaces joining the upper and lower surfaces of the block to form upper and lower surface edges, the method comprising:

forming the blocks in a mold;

removing the blocks from the mold;

positioning the blocks in a first treatment station including an edge rounding member;

simultaneously rounding the upper and lower face edges of the first and second opposed faces of the blocks in the first treatment station;

positioning the blocks in a second treatment station including a surface roughening member; and roughening the first and second opposed faces in the second treatment station.

32. The method of claim 31 further comprising curing the blocks.

33. The method of claim 31 wherein the step of rounding comprises striking the block edges with hammer elements.

34. The method of claim 31 wherein the step of roughening comprises striking the first and second opposed faces with flailing elements.

35. The method of claim 31 wherein the step of rounding the upper and lower face edges further comprises immobilizing the blocks.

36. The method of claim 31 wherein the step of roughening further comprises moving the blocks through the second treatment station as the first and second opposed faces are roughened.

37. The method of claim 31 further comprising:

rotating the blocks within the first treatment station, and rounding the upper and lower surface edges of at least one of the first and second side surfaces of the block.

38. The method of claim 31 further comprising:

rotating the blocks within the second treatment station, and roughening at least one of the first and second side surfaces in the second treatment station.

39. A method of making wall blocks, the blocks each having an upper surface opposed to a lower surface, first and second opposed faces joining the upper and lower surfaces of the block to form upper and lower face edges, and first and second side surfaces joining the upper and lower surfaces to form upper and lower surface edges, the method comprising:

forming the blocks in a mold which imparts a roughened surface texture to at least one of the first and second opposed faces of the blocks;

removing the blocks from the mold;

positioning at least one of the blocks in a first treatment station; and simultaneously rounding the upper and lower face edges of the first and second opposed faces in the first treatment station without tumbling the at least one block together with other blocks in a block tumbler.

40. The method of claim 39 further comprising curing the blocks.

41. The method of claim 39 wherein the step of rounding comprises striking the upper and lower face edges with hammer elements.

42. The method of claim 39 wherein the step of treating the at least one block in the first treatment station further comprises immobilizing the at least one block.

43. The method of claim 39 wherein the step of treating the at least one block in the second treatment station further comprises moving the at least one block through the second treatment station as the surface is roughened.

44. The method of claim 39 further comprising:

rotating the at least one block within the first treatment station, and rounding the upper and lower surface edges of at least one of the first and second side surfaces of the block.

45. The method of claim 39 further comprising:

rotating the block within the second treatment station, and treating the block to roughen the surface of at least one of the first and second side surfaces.

46. The method of claim 39 further comprising:

positioning the at least one block in a second treatment station; and treating the at least one block to further roughen the at least one face having a roughened surface texture.

47. The method of claim 46 wherein the step of treating the at least one block to further roughen a surface comprises striking the block surface with flailing elements.

48. A method of making wall blocks, the blocks each having an upper surface opposed to a lower surface, first and second opposed faces joining the upper and lower surfaces of the block to form upper and lower face edges, and first and second side surfaces joining the upper and lower surfaces of the block to form upper and lower surface edges, the method comprising:

forming the blocks in a mold which imparts a roughened surface texture to at least one of the faces of the first and second opposed faces of the blocks;

removing the blocks from the mold;

positioning at least one of the blocks in a first treatment station including an edge rounding member;

simultaneously rounding the upper and lower face edges of the first and second opposed faces of the at least one block having a roughened surface texture in the first treatment station without tumbling the at least one block together with other blocks in a block tumbler;

positioning the at least one block in a second treatment station including a surface roughening member; and further roughening the surfaces of the first and second opposed faces in the second treatment station.

49. The method of claim 48 further comprising curing the blocks.

50. The method of claim 48 wherein the step of rounding comprises striking the upper and lower face edges with hammer elements.

51. The method of claim 48 wherein the step of further roughening comprises striking the surfaces of the first and second opposed faces with flailing elements.

52. The method of claim 48 wherein the step of treating the at least one block in the first treatment station further comprises immobilizing the block.

53. The method of claim 48 wherein to step of further roughening the at least one block in the second treatment station further comprises moving the at least one block through the second treatment station as the surface is further roughened.

54. The method of claim 48 further comprising:

rotating the at least one block within the first treatment station, and rounding the upper and lower surface edges of the first and second side surfaces of the at least one block.

55. The method of claim 48 further comprising:

rotating the block within the second treatment station, and roughening the surfaces of the first and second side surfaces of the at toast one block.

* * * * *